United States Patent
Shachar

(10) Patent No.: US 6,728,743 B2
(45) Date of Patent: Apr. 27, 2004

(54) MODULO REMAINDER GENERATOR

(75) Inventor: Ariel Shachar, Haifa (IL)

(73) Assignee: Mellanox Technologies Ltd., Yokneam (IL)

( * ) Notice: Subject to any disclaimer, the term of this patent is extended or adjusted under 35 U.S.C. 154(b) by 688 days.

(21) Appl. No.: 09/754,479

(22) Filed: Jan. 4, 2001

(65) Prior Publication Data

US 2002/0129074 A1 Sep. 12, 2002

(51) Int. Cl.[7] ............................. G06F 7/38; G06F 7/52
(52) U.S. Cl. ...................................... 708/491; 708/653
(58) Field of Search ............................ 708/491, 492, 708/650, 653

(56) References Cited

U.S. PATENT DOCUMENTS

| | | | | |
|---|---|---|---|---|
| 4,107,783 A | * | 8/1978 | Huang | 708/491 |
| 4,190,893 A | * | 2/1980 | Gajski | 708/491 |
| 4,555,769 A | * | 11/1985 | Carter et al. | 708/491 |
| 5,499,202 A | * | 3/1996 | Takahashi et al. | 708/650 |

* cited by examiner

Primary Examiner—Chuong Dinh Ngo
(74) Attorney, Agent, or Firm—Mark M. Friedman

(57) ABSTRACT

Apparatus for determining a remainder of a modulo division of a binary number made up of a string of bits, including a first plurality of substantially similar cells coupled in a linear sequence, the first plurality of cells including at least a first cell and a last cell. Each cell of the first plurality includes a second plurality of binary input terminals, the input terminals of the first cell being coupled to receive a predetermined input, and a second plurality of binary output terminals, each coupled, except for the output terminals of the last cell, to a respective one of the input terminals of a subsequent cell in the sequence. Each cell of the first plurality further includes a control input terminal, coupled to receive one of the bits in the string corresponding to a position of the cell in the sequence. The remainder is generated at the output terminals of the last cell in the sequence.

10 Claims, 2 Drawing Sheets

MODULO REMAINDER GENERATOR

FIELD OF THE INVENTION

The present invention relates generally to computerized arithmetic operations, and specifically to finding a remainder after a computerized operation of division.

BACKGROUND OF THE INVENTION

Computing systems frequently require a rounding-up or a rounding-down operation to be performed. For example, a multi-block transfer is described in a descriptor which typically comprises a header having an arbitrary number of doublewords, and 3 doublewords for each block of data transferred (a first doubleword giving a high address, a second doubleword giving a low address, and a third doubleword giving a length). The descriptor is written to a memory in which each line of the memory includes 3 doublewords. In order to determine how many lines of memory are needed, the total number of doublewords in the descriptor is rounded-up to the closest number which is a multiple of 3. To perform the rounding-up, a modulo-3 (mod-3) division of the number of doublewords in the descriptor is performed. Knowledge of the quotient and remainder of the division allows calculation of the required rounded-up number.

FIG. 1 is a schematic diagram of a finite state machine (FSM) 10 used to determine a mod-3 remainder after a division operation, as is known in the art. Machine 10 may be implemented as a hardware or software device, or as a combined hardware and software device, by methods known in the art. FSM 10 comprises a remainder 0 state 14, a remainder 1 state 16, and a remainder 2 state 18. Remainder 0 state 14 is set as an initial state. A binary number 12, herein assumed to be 11010 by way of example, is input to state 14, starting with its most significant digit (MSB). In a first cycle of FSM 10, since the MSB is 1, the state moves to remainder 1 state 16. Table I hereinbelow shows the states of FSM 10 as the binary digit is fed into the machine.

TABLE I

| Input Number | 1 | 1 | 0 | 1 | 0 |
|---|---|---|---|---|---|
| Remainder State | +1 | +0 | +0 | +1 | +2 |
| Number of Cycles | 1 | 2 | 3 | 4 | 5 |

Table I shows that after 5 cycles, corresponding to the number of bits in number 12, FSM 10 halts at remainder 2 state, so that the remainder after dividing 11010 by a mod-3 division is +2. In general, for a binary number of length n, FSM 10 requires n cycles in order to determine the mod-3 remainder.

SUMMARY OF THE INVENTION

It is an object of some aspects of the present invention to provide a method and apparatus for determining a remainder after a modulo division of a binary number.

It is a further object of some aspects of the present invention to provide apparatus for determining a remainder requiring only one cycle of operation of the apparatus.

In preferred embodiments of the present invention, a modulo-n (mod-n) remainder of a binary number is determined, wherein n is a whole number greater than or equal to 2. The mod-n remainder is the value remaining after a mod-n division is performed on the number. The remainder is determined in a generator comprising a plurality of cells, each cell comprising n multiplexers. The plurality of cells corresponds to the number of bits in the binary number, and the multiplexer cells are coupled together in a linear sequence to form the generator. For each binary number input to the generator, the generator outputs an encoded value corresponding to the appropriate mod-n remainder in one cycle of operation of the generator. The ability to determine the mod-n remainder in one cycle significantly enhances the speed of remainder determination compared to methods known in the art.

There is therefore provided, according to a preferred embodiment of the present invention, apparatus for determining a remainder of a module division of a binary number made up of a string of bits, including:

a first plurality of substantially similar cells coupled in a linear sequence, the first plurality of cells including at least a first cell and a last cell, each cell of the first plurality including:

a second plurality of binary input terminals, the input terminals of the first cell being coupled to receive a pre-determined input;

a second plurality of binary output terminals, each coupled, except for the output terminals of the last cell, to a respective one of the input terminals of a subsequent cell in the sequence; and a control input terminal, coupled to receive one of the bits in the string corresponding to a position of the cell in the sequence, so as to generate the remainder at the output terminals of the last cell in the sequence.

Preferably, the remainder is determined within one cycle of operation of the apparatus.

Preferably, each cell comprises a second plurality of multiplexers, wherein each multiplexer includes:

a first multiplexer input connected to one of the binary input terminals;

a second multiplexer input connected to another of the binary input terminals;

a multiplexer control input connected to the control input terminal; and an output terminal connected to one of the binary output terminals and coupled to receive the first or the second multiplexer input responsive to a signal on the control input, wherein each binary input terminal is connected to the first multiplexer input of one of the multiplexers and the second multiplexer input of another of the multiplexers, and each of the binary output terminals is connected to a respective one of the multiplexers.

Further preferably, the second plurality is three, and each of the first plurality of cells, given respective input values for a first one of the input terminals I0, a second one of the input terminals I1, a third one of the input terminals I2, and the control input terminal shown in the following table, a first one of the output terminals o0, a second one of the output terminals o1, and a third one of the output terminals o2 output values as shown in the table:

| Input | | | | Output | | |
|---|---|---|---|---|---|---|
| I0 | I1 | I2 | Control | o0 | o1 | o2 |
| 1 | 0 | 0 | 0 | 1 | 0 | 0 |
| 1 | 0 | 0 | 1 | 0 | 1 | 0 |

-continued

| Input | | | | Output | | |
|---|---|---|---|---|---|---|
| I0 | I1 | I2 | Control | o0 | o1 | o2 |
| 0 | 1 | 0 | 0 | 0 | 0 | 1 |
| 0 | 1 | 0 | 1 | 1 | 0 | 0 |
| 0 | 0 | 1 | 0 | 0 | 1 | 0 |
| 0 | 0 | 1 | 1 | 0 | 0 | 1 |

Preferably, the binary number includes a number of bit that is no more than a value of the first plurality.

Preferably, a module of the module division is equal to a value of the second plurality.

There is further provided, according to a preferred embodiment of the present invention, a method for determining a remainder of a module division of a binary number made up of a string of bits, including:

providing a first plurality of substantially similar cells, the first plurality of cells including at least a first cell and a last cell, each cell including a second plurality of binary input terminals and a second plurality of binary output terminals and a control input terminal;

coupling the cells in a linear sequence so that each of the binary output terminals of a cell in the sequence, except for the output terminals of the last cell, is connected to the respective binary input terminals of a subsequent cell in the sequence;

inputting a pre-determined input to the input terminals of the first cell;

inputting each bit of the string to the corresponding control input terminal of the cell in the sequence; and generating the remainder at the output terminals of the last cell in the sequence.

Preferably, generating the remainder includes generating the remainder within one cycle of operation of the first plurality of cells.

Preferably, the binary number includes a number of bits that is no more than a value of the first plurality.

Further preferably, a modulo of the modulo division is equal to a value of the second plurality.

The present invention will be more fully understood from the following detailed description of the preferred embodiments thereof, taken together with the drawings, in which:

DETAILED DESCRIPTION OF PREFERRED EMBODIMENTS

Figure 1:
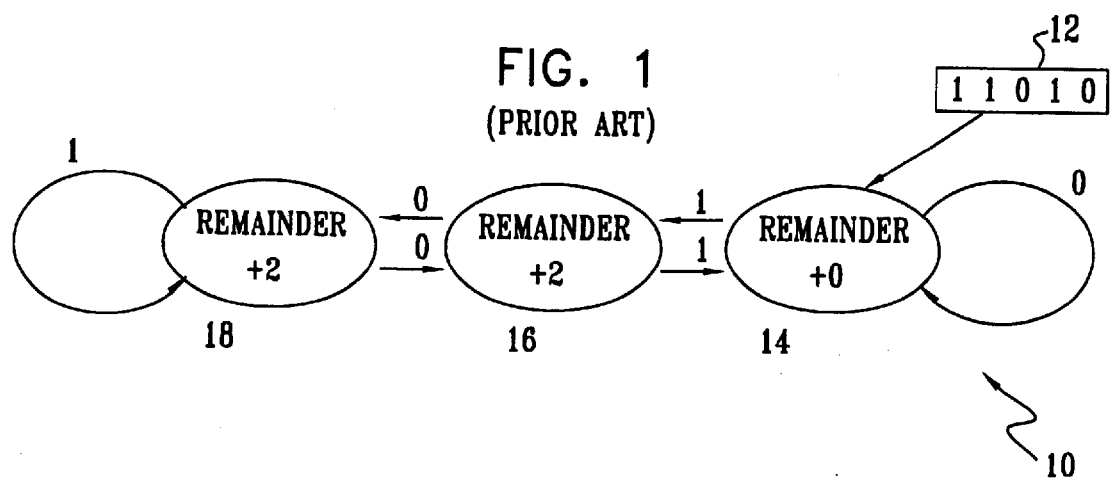
FIG. 1 is a schematic diagram of a finite state machine used to determine a remainder after a division operation, as is known in the art.
Figure 2A:
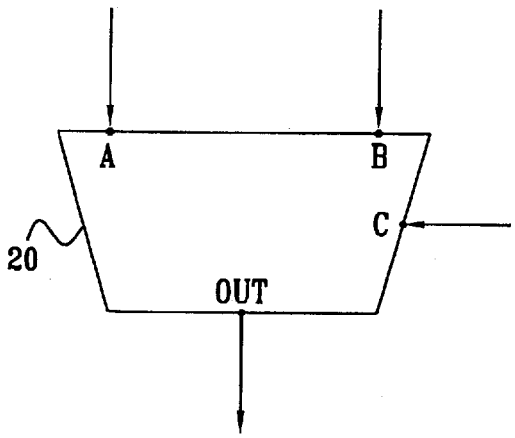
FIG. 2A is a schematic diagram of a multiplexer, according to a preferred embodiment of the present invention.

Reference is now made to FIG. 2A, which is a schematic diagram of a multiplexer 20, according to a preferred embodiment of the present invention. Multiplexer 20 comprises a first input A, a second input B, a control input C, and an output "OUT." Inputs A, B, C, accept binary level inputs of 0 or 1. If control input C is 0, an output level at output "OUT" is set by multiplexer 20 to the value at first input A. If control input C is 1, an output level at output "OUT" is set by multiplexer 20 to the value at second input B. Table II hereinbelow shows values of A, B, C, and "OUT" for multiplexer 20, wherein "x" corresponds to a value that can be either 0 or 1.

TABLE II

| C | A | B | OUT |
|---|---|---|---|
| 1 | x | 1 | 1 |
| 1 | x | 0 | 0 |
| 0 | 1 | x | 1 |
| 0 | 0 | x | 0 |

Multiplexer 20 is most preferably implemented as part of a very large scale integrated (VLSI) circuit, by methods known in the art. Alternatively, multiplexer 20 is implemented from discrete components and/or as a custom or semi-custom device.

Figure 2B:
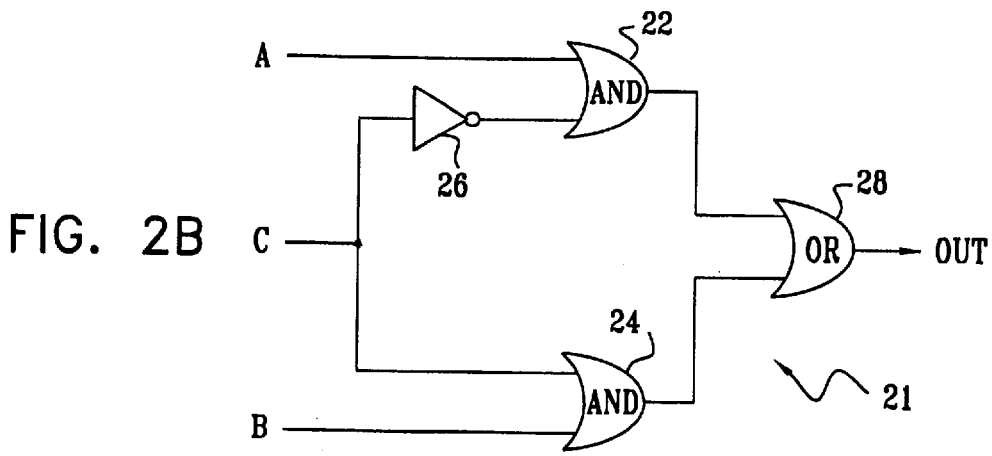
FIG. 2B is a schematic diagram of a logic circuit corresponding to the multiplexer of FIG. 2A, according to a preferred embodiment of the present invention.

FIG. 2B is a schematic diagram of a logic circuit 21 corresponding to multiplexer 20, according to a preferred embodiment of the present invention. Logic circuit 21 comprises a first AND gate 22 and a second AND gate 24. The outputs of the AND gates are coupled to an OR gate 28 which gives output "OUT." AND gate 22 receives input A and, via an inverter 26, control input C. AND gate 24 receives input A and control input C. Other implementations of multiplexer 20, such as two transistors, one being switched off by control input C when the other is switched on by control input C, will be apparent to those skilled in the art.

Figure 3:
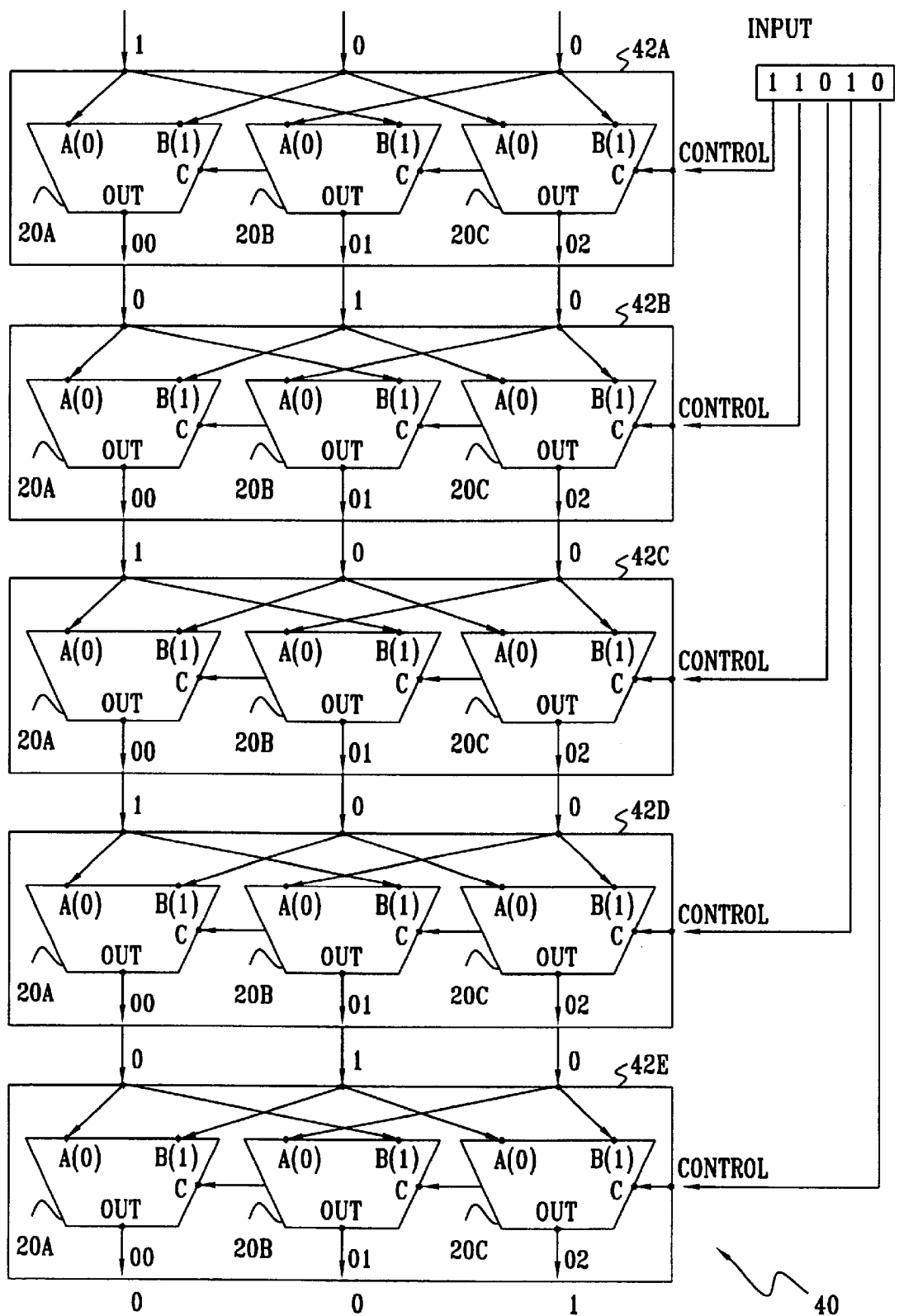
FIG. 3 is a schematic diagram of a remainder generator, according to a preferred embodiment of the present invention.

FIG. 3 is a schematic diagram of a remainder generator 40, according to a preferred embodiment of the present invention. Generator 40 comprises a plurality of substantially similar cells 42A, 42B, 42C, 42D, and 42E, which are connected together in a linear sequence. Cells 42A, 42B, 42C, 42D, and 42E are also hereinbelow referred to generically as cell 42. While for the purposes of example generator 40 is herein assumed to have five cells 42, it will be appreciated that generator 40 can be implemented from any whole number of cells 42. The number of cells is determined by the maximum number of bits there may be in an input number whose remainder is to be determined by generator 40. Each cell 42 comprises three multiplexers 20A, 20B, and 20C, which are substantially similar in implementation and operation to multiplexer 20, described hereinabove. The number of multiplexers in each cell determines the largest modulo with respect to which the remainder can be found using generator 40.

Each cell 42 has a first input terminal I0, a second input terminal I1, and a third input terminal I2. First input terminal I0 is connected to input A of multiplexer 20A and input B of multiplexer 20B. Second input terminal I1 is connected to input B of multiplexer 20A and input A of multiplexer 20C. Third input terminal I2 is connected to input A of multiplexer 20B and input B of multiplexer 20C. Each cell 42 has a first output terminal o0, a second output terminal o1, and a third output terminal o2, which are respectively directly connected to the output OUT of multiplexer 20A, 20B, and 20C. Each cell 42 also has an input "CONTROL" terminal connected to the three control inputs C of the multiplexers comprised in the specific cell.

Generator 40 is implemented by coupling output terminals o0, o1, and o2 of each cell 42 to respective input terminals I0, I1, and I2 of a subsequent cell 42. Input terminal I0 of a first cell 42A is set to a value 1, and input terminals I1 and I2 of the cell are set to a value 0. Thus, the input (I0, I1, I2) to the first cell is set to be (1, 0, 0). Input (I0, I1, I2) to the first cell could also be set to (0, 1, 0) or to (0, 0, 1). The value of input (I0, I1, I2) to the first cell only affects which remainder, 0, 1, or 2, output terminals o0, o1, and o2 correspond to. Output terminals o0, o1, and o2 of a final cell 42E generate a binary digit, which, when encoded, corresponds to a value of a remainder when a 5-bit binary number undergoes mod-3 division, as is explained in more detail below.

Generator 40 is designed so that the input value at the three input terminals I0, I1, and I2 of a specific cell 42 comprises one value 1, and two values 0. Thus, each cell 42 has three possible inputs, and respective outputs which depend on the input and on a value input at the control input. Table III hereinbelow shows the corresponding values for inputs, outputs, and control input for each cell 42.

TABLE III

| Input | | | | Output | | |
|---|---|---|---|---|---|---|
| I0 | I1 | I2 | Control | o0 | o1 | o2 |
| 1 | 0 | 0 | 0 | 1 | 0 | 0 |
| 1 | 0 | 0 | 1 | 0 | 1 | 0 |
| 0 | 1 | 0 | 0 | 0 | 0 | 1 |
| 0 | 1 | 0 | 1 | 1 | 0 | 0 |
| 0 | 0 | 1 | 0 | 0 | 1 | 0 |
| 0 | 0 | 1 | 1 | 0 | 0 | 1 |

For the purposes of explanation, the 5-bit number input to generator 40 is assumed to be 11010, although it will be understood that any 5-bit number could be the input. 11010 has 1 as its most significant bit (MSB), and the MSB is input to CONTROL of cell 42A. As shown in FIG. 3, 1 is input to CONTROL of cell 42B, 0 is the input to CONTROL of cell 42C, 1 is input to CONTROL of cell 42D, and 0 is input to CONTROL of cell 42E.

Table II above shows that the outputs of cell 42A are o0=0, o1=1, and o2=0. These outputs are applied to the corresponding inputs of cell 42B. Table IV below shows the outputs of all cells 42, as each cell 42 generates its output according to Table III.

TABLE IV

| Cell | Control Value | o0 | o1 | o2 |
|---|---|---|---|---|
| 42A | 1 | 0 | 1 | 0 |
| 42B | 1 | 1 | 0 | 0 |
| 42C | 0 | 1 | 0 | 0 |
| 42D | 1 | 0 | 1 | 0 |
| 42E | 0 | 0 | 0 | 1 |

The "1" in the output of cell 42E acts as a "pointer" to the value of the remainder. Table IV shows that the binary output of cell 42E is 001, corresponding to remainder 2. Thus, an output 001 encodes to a remainder 2. Similarly, a binary output 010 encodes to a remainder 1, and a binary output 100 encodes to a remainder 0.

It will be appreciated that generator 40 generates its remainder by inputting the binary number in parallel to the control input terminals of the generator. The generator thus forms the remainder in a single cycle of operation.

Generator 40 comprises five cells in a linear sequence, each cell having 3 multiplexers, 3 inputs terminals, and 3 output terminals. Generator 40 thus generates a mod-3 remainder of a 5-bit number. In general, to generate a mod-n remainder of a binary number, a generator must have a plurality of cells each having n multiplexers, n input terminals, and n output terminals, where n is a whole number, and where the multiplexers and input and output terminals are coupled substantially as described above for generator 40. In order to generate a remainder for an m-bit number, the generator should have m cells coupled in a linear sequence, where m is a whole number. It will be appreciated that a generator having m cells is able to generate a remainder for a binary number having m or fewer digits. When the binary number has fewer than m digits, the number may be transformed to an m-bit binary number, for the purposes of being used in the generator, by adding leading zeros. In cases where m is large enough to cause latency problems, the path through the generator may by divided into sub-sections with memory elements connecting the sub-sections.

It will be appreciated that while each cell 42 has been described hereinabove as using a plurality of multiplexers, other computer logic elements, such as one or more AND, NAND, OR, or NOR gates, or other logic elements known in the art, may be used to implement each cell 42, so that Table III will be true for each cell 42.

It will further be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Apparatus for determining a remainder of a modulo division of a binary number made up of a string of bits, comprising:

a first plurality of substantially similar cells coupled in a linear sequence, the first plurality of cells comprising at least a first cell and a last cell, each cell of the first plurality comprising:

a second plurality of binary input terminals, the input terminals of the first cell being coupled to receive a pre-determined input;

a second plurality of binary output terminals, each coupled, except for the output terminals of the last cell, to a respective one of the input terminals of a subsequent cell in the sequence; and a control input terminal, coupled to receive one of the bits in the string corresponding to a position of the cell in the sequence, so as to generate the remainder at the output terminals of the last cell in the sequence.

2. Apparatus according to claim 1, wherein the remainder is determined within one cycle of operation of the apparatus.

3. Apparatus according to claim 1, wherein each cell comprises a second plurality of multiplexers, wherein each multiplexer comprises:

a first multiplexer input connected to one of the binary input terminals;

a second multiplexer input connected to another of the binary input terminals;

a multiplexer control input connected to the control input terminal; and an output terminal connected to one of the binary output terminals and coupled to receive the first or the second multiplexer input responsive to a signal on the control input, wherein each binary input terminal is connected to the first multiplexer input of one of the multiplexers and the second multiplexer input of another of the multiplexers, and each of the binary output terminals is connected to a respective one of the multiplexers.

4. Apparatus according to claim 1, wherein the second plurality is three, and wherein for each of the first plurality of cells, given respective input values for a first one of the input terminals I0, a second one of the input terminals I1, a third one of the input terminals I2, and the control input terminal shown in the following table, a first one of the output terminals o0, a second one of the output terminals o1, and a third one of the output terminals o2 receive output values as shown in the table:

| Input | | | | Output | | |
|---|---|---|---|---|---|---|
| I0 | I1 | I2 | Control | o0 | o1 | o2 |
| 1 | 0 | 0 | 0 | 1 | 0 | 0 |
| 1 | 0 | 0 | 1 | 0 | 1 | 0 |
| 0 | 1 | 0 | 0 | 0 | 0 | 1 |
| 0 | 1 | 0 | 1 | 1 | 0 | 0 |
| 0 | 0 | 1 | 0 | 0 | 1 | 0 |
| 0 | 0 | 1 | 1 | 0 | 0 | 1 |

5. Apparatus according to claim 1, wherein the binary number comprises a number of bits that is no more than a value of the first plurality.

6. Apparatus according to claim 1, wherein a modulo of the modulo division is equal to a value of the second plurality.

7. A method for determining a remainder of a modulo division of a binary number made up of a string of bits, comprising:

providing a first plurality of substantially similar cells, the first plurality of cells comprising at least a first cell and a last cell, each cell comprising a second plurality of binary input terminals and a second plurality of binary output terminals and a control input terminal;

coupling the cells in a linear sequence so that each of the binary output terminals of a cell in the sequence, except for the output terminals of the last cell, is connected to the respective binary input terminals of a subsequent cell in the sequence;

inputting a pre-determined input to the input terminals of the first cell;

inputting each bit of the string to the corresponding control input terminal of the cell in the sequence; and generating the remainder at the output terminals of the last cell in the sequence.

8. A method according to claim 7, wherein generating the remainder comprises generating the remainder within one cycle of operation of the first plurality of cells.

9. A method according to claim 7, wherein the binary number comprises a number of bits that is no more than a value of the first plurality.

10. A method according to claim 7, wherein a modulo of the modulo division is equal to a value of the second plurality.

* * * * *